(12) United States Patent
Fleming et al.

(10) Patent No.: US 10,718,673 B2
(45) Date of Patent: Jul. 21, 2020

(54) THERMAL PROPERTY PROBE

(71) Applicants: Austin Fleming, South Jordan, UT (US); Charles Folsom, Jackson, MT (US); Colby Jensen, Preston, ID (US); Heng Ban, Logan, UT (US)

(72) Inventors: Austin Fleming, South Jordan, UT (US); Charles Folsom, Jackson, MT (US); Colby Jensen, Preston, ID (US); Heng Ban, Logan, UT (US)

(73) Assignee: Utah State University, Logan, UT (US)

( * ) Notice: Subject to any disclaimer, the term of this patent is extended or adjusted under 35 U.S.C. 154(b) by 270 days.

(21) Appl. No.: 15/828,843

(22) Filed: Dec. 1, 2017

(65) Prior Publication Data

US 2018/0156674 A1    Jun. 7, 2018

Related U.S. Application Data

(60) Provisional application No. 62/428,800, filed on Dec. 1, 2016.

(51) Int. Cl.
| | |
|---|---|
| *G01K 1/00* | (2006.01) |
| *G01K 11/00* | (2006.01) |
| *G01J 5/00* | (2006.01) |
| *G01K 11/32* | (2006.01) |
| *G01K 11/12* | (2006.01) |
| *G01N 25/18* | (2006.01) |

(52) U.S. Cl.
CPC ............ *G01K 11/32* (2013.01); *G01K 11/125* (2013.01); *G01K 11/3206* (2013.01); *G01N 25/18* (2013.01)

(58) Field of Classification Search
USPC ........................................ 374/120, 131, 161
See application file for complete search history.

(56) References Cited

U.S. PATENT DOCUMENTS 6,381,019 B1 *   4/2002   Maris ..................... G01N 29/22
                                                     356/432

OTHER PUBLICATIONS

Rosencwaig et al., Detection of thermal waves through optical reflectance, Applied Physics Letters, 1013-1015 (1985).
Paddock et al., Transient thermoreflectance from thin metal films, 60:1, Journal of Applied Physics, 285-290 (1986).
Capinski et al., Thermal-conductivity measurements of GaAs/AlAs superlattices using a picosecond optical pump-and-probe technique, 59:12, Physical Review B, 8105 (1999).

(Continued)

*Primary Examiner* — Mirellys Jagan

(57) ABSTRACT

A fiber-based thermal property probe is disclosed. In embodiments, the thermal property probe is a modulated optical reflectance system and includes a pump beam source configured to transmit a pump beam through a pump fiber, the pump beam configured to heat a sample and the pump fiber having a pump fiber sample end. The fiber-based thermal property probe further includes a probe beam source configured to transmit a probe beam through a probe fiber, the probe beam configured to measure the temperature of the sample and the probe fiber having a probe fiber sample end. Additionally, the system includes a ferrule configured to hold the pump fiber sample end and the probe fiber sample end at a fixed, known separation distance from each other.

15 Claims, 12 Drawing Sheets

(56) References Cited

OTHER PUBLICATIONS

Belliard et al., Determination of the thermal diffusivity of bulk and layered samples by time domain thermoreflectance: Interest of lateral heat diffusion investigation in nanoscale time range, 117:6, Journal of Applied Physics, 065306 (2015).
Collins et al., Examining thermal transport through a frequency-domain representation of time-domain thermoreflectance data, 85:12, Review of Scientific Instruments, 124903 (2014).
Fournier et al., Lateral heat diffusion in layered structures: Theory and photothermal experiments, 153:1, The European Physical Journal Special Topics, 69-73 (2008).
Malen et al., Optical measurement of thermal conductivity using fiber aligned frequency domain thermoreflectance, 133:8, Journal of Heat Transfer, 081601 (2011).
Li et al., Thermal characterization of film-on-substrate systems with modulated thermoreflectance microscopy, 71:5, Review of Scientific Instruments, 2154-2160 (2000).
Li et al., Complete thermal characterization of film-on-substrate system by modulated thermoreflectance microscopy and multiparameter fitting, 86:9, Journal of Applied Physics, 5314-5316 (1999).
Schmidt et al., Pump-probe thermoreflectance, 16:1, Annual Review of Heat Transfer, (2013).
Almond et al., Photothermal science and techniques, vol. 10, Springer Science & Business Media (1996).
Langer et al., Thermal conductivity of thin metallic films measured by photothermal profile analysis, 68:3, Review of Scientific Instruments, 1510-1513 (1997).
Salazar et al., Thermal diffusivity measurements using linear relations from photothermal wave experiments, 65:9, Review of scientific instruments, 2896-2900 (1994).
Maznev et al., Thermal wave propagation in thin films on substrates, 78:9, Journal of applied physics, 5266-5269 (1995).

Hua et al., The study of frequency-scan photothermal reflectance technique for thermal diffusivity measurement, 86:5, Review of Scientific Instruments, 054901 (2015).
Yarai et al., Laptop photothermal reflectance measurement instrument assembled with optical fiber components, 78:5, Review of scientific instruments, 054903 (2007).
Eyal et al., Fiber-optic pulsed photothermal radiometry for fast surface-temperature measurements, 37:25, Applied Optics, 5945-5950 (1998).
Beard et al., Optical fiber photoacoustic-photothermal probe, 23:15, Optics letters, 1235-1237 (1998).
Laufer et al., Comparison of the photothermal sensitivity of an interferometric optical fiber probe with pulsed photothermal radiometry, 73:9, Review of scientific instruments, 3345-3352 (2002).
Capinski et al., Improved apparatus for picosecond pump-and-probe optical measurements, Review of Scientific Instruments, 67:8, Review of Scientific Instruments, 2720-2726 (1996).
Feldman et al., Algorithm for solutions of the thermal diffusion equation in a stratified medium with a modulated heating source, 31:3, High Temeperatures. High Pressures. 293-298 (1999).
Feldman et al., Algorithm for solutions of the thermal diffusion equation in a stratified medium with a modulated heating source, 31:3, High Temeperatures. High Pressures. 293-298 (1996).
Maillet et al., Thermal quadrupoles: solving the heat equation through integral transforms, John Wiley & Sons, pp. 64-133 (2000).
Maillet et al., Thermal quadrupoles: solving the heat equation through integral transforms, John Wiley & Sons, pp. 134-209 (2000).
Salazar et al., Simultaneous measurement of thermal diffusivity and optical absorption coefficient using photothermal radiometry. II Multilayered solids, 110:3, Journal of Applied Physics, 033516 (2011).
Schmidt et al., A frequency-domain thermoreflectance method for the characterization of thermal properties, 80:9, Review of Scientific Instruments, 094901 (2009).

* cited by examiner

THERMAL PROPERTY PROBE

RELATED APPLICATIONS

This patent application claims the benefit of U.S. Provisional Application 62/428,800, filed Dec. 1, 2016 and entitled THERMAL PROPERTY PROBE, which is incorporated herein by reference in its entirety.

TECHNICAL FIELD

The present disclosure relates to fiber-based, thermal-property probes.

BACKGROUND

A modulated optical reflectance (MOR) technique was first developed by Rosencwaig in 1985 when it was found that thermal waves could be detected using the change in optical reflectivity due to the change in surface temperature See A. Rosencwaig, J. Opsal, W. Smith, D. Willenborg, Detection of thermal waves through optical reflectance, Applied Physics Letters, 46 (1985) 1013-1015. This measurement technique utilizes two lasers. One laser is used to produce a transient thermal response in the sample (pump), and the second laser (probe) is used to detect the thermal response based on its reflection off the sample's surface. MOR measurements are largely separated into two categories in which the pump and probe beams are either pulsed or continuous. In both cases the pump beam is typically modulated periodically and amplitude and phase of the probe beam, relative to the pump beam, is the measured quantity. In the pulsed configurations, often referred to as time-domain thermoreflectance (TDTR), the amplitude and phase of the probe beam is measured while either the modulation frequency of the pump beam or the delay between pulses is varied. See C. A. Paddock et al., Transient thermoreflectance from thin metal films, Journal of Applied Physics, 60 (1986) 285-290; W. Capinski, H. Maris et al., Thermal-conductivity measurements of GaAs/AlAs superlattices using a picosecond optical pump-and-probe technique, Physical Review B, 59 (1999) 8105; L. Belliard et al., Determination of the thermal diffusivity of bulk and layered samples by time domain thermoreflectance: Interest of lateral heat diffusion investigation in nanoscale time range, Journal of Applied Physics, 117 (2015) 065306; and K. C. Collins et al., Examining thermal transport through a frequency-domain representation of time-domain thermoreflectance data, Review of Scientific Instruments, 85 (2014) 124903.

In the non-pulsed configuration, often referred to as frequency-domain thermoreflectance (FDTR), the amplitude and phase of the probe beam is measured while the modulation frequency of the pump beam is varied or the distance between the pump and probe is varied. See D. Fournier et al., Lateral heat diffusion in layered structures: Theory and photothermal experiments, The European Physical Journal Special Topics, 153 (2008) 69-73; J. A. Malen et al., Optical measurement of thermal conductivity using fiber aligned frequency domain thermoreflectance, Journal of Heat Transfer, 133 (2011) 081601; B. Li et al., Thermal characterization of film-on-substrate systems with modulated thermoreflectance microscopy, Review of scientific instruments, 71 (2000) 2154-2160; and B. Li et al., Complete thermal characterization of film-on-substrate system by modulated thermoreflectance microscopy and multiparameter fitting, Journal of Applied Physics, 86 (1999) 5314-5316. A thorough summary of both TDTR and FDTR has been provide by Schmidt. See A. J. Schmidt, Pump-probe thermoreflectance, Annual Review of Heat Transfer, 16 (2013).

The periodic heating of the pump beam induces a periodic thermal response in the sample which is often referred to as thermal waves. There are many thermal measurement techniques that utilize this type of periodic heating from a modulated laser to generate thermal waves. See D. P. Almond et al., Photothermal science and techniques, Springer Science & Business Media, 1996. The detection of these thermal waves by use of the reflected pump beam is what distinguishes FDTR from other techniques.

There are many variations in the experimental setups of FDTR systems, which, applicants of the present disclosure categorize into two cases. In the first case the pump and probe beam are located concentrically on the sample and in the second case the two beams are offset from each other. Often a scanning technique is used where the probe beam measures the surface temperature at various distances from the pump beam. See G. Langer et al., Thermal conductivity of thin metallic films measured by photothermal profile analysis, Review of Scientific Instruments, 68 (1997) 1510-1513; A. Salazar et al., Thermal diffusivity measurements using linear relations from photothermal wave experiments, Review of scientific instruments, 65 (1994) 2896-2900; and A. Maznev et al., Thermal wave propagation in thin films on substrates, Journal of applied physics, 78 (1995) 5266-5269. FIG. 1 illustrates a diagram for a traditional MOR system using spatial scanning of the probe beam. Recently, an analogous technique has been developed that measures the temperature amplitude and phase at a given radius from the pump beam, for a range of frequencies. See Z. Hua et al., The study of frequency-scan photothermal reflectance technique for thermal diffusivity measurement, Review of Scientific Instruments, 86 (2015) 054901. This configuration has some advantages over the experimental setup required for a scanning probe beam.

Optical fiber based MOR systems have been developed in the past by Yarai et al. See A. Yarai, T. Nakanishi, Laptop photothermal reflectance measurement instrument assembled with optical fiber components, Review of scientific instruments, 78 (2007) 054903. Other photothermal techniques have employed the use of fiber optics in both delivering the heating power and in the sensing technique. See O. Eyal et al., Fiber-optic pulsed photothermal radiometry for fast surface-temperature measurements, Applied optics, 37 (1998) 5945-5950; P. Beard et al., Optical fiber photoacoustic—photothermal probe, Optics letters, 23 (1998) 1235-1237; and J. Laufer et al., Comparison of the photothermal sensitivity of an interferometric optical fiber probe with pulsed photothermal radiometry, Review of scientific instruments, 73 (2002) 3345-3352. Others have used fiber components to align the pump and probe beams or to improve accuracy of the measurement. See J. A. Malen et al., Optical measurement of thermal conductivity using fiber aligned frequency domain thermoreflectance, Journal of Heat Transfer, 133 (2011) 081601W.S; and Capinski et al., Improved apparatus for picosecond pump-and-probe optical measurements, Review of Scientific Instruments, 67 (1996) 2720-2726. In these fiber-based MOR systems, only concentric pump and probe configurations, where both the pump and probe beam are ultimately transmitted to the sample in a single fiber, have been explored.

SUMMARY

The configurations of previous concentric, fiber-based modulated optical reflectance (MOR) systems limits the applications of the MOR apparatus since an offset distance between the pump and probe beams could not be attained. The present disclosure in aspects and embodiments addresses these various needs and problems by providing a new fiber-based thermal properties probe configuration that maintains the fiber based heating (pump) laser and detection (probe) laser in close proximity but at a fixed separation distance. The pump beam periodically heats the sample inducing thermal waves into the sample. The probe beam, through a probe fiber, measures the phase of the temperature at a known distance away from the pump beam for a range of modulation frequencies. This allows for the measurement of thermal diffusivity of a bulk material that has a reflective coating. This is ideal for in-situ measurements, and has many advantages for laboratory-based systems.

In the Examples Section of this disclosure, applicants of the present disclosure describe the design and development of the system along with theoretical justification for the experimental design. Using an embodiment of the present disclosure, applicants measured the thermal diffusivity of Ge and SiC within 10% of literature values. Additionally, the diffusivity for $SiO_2$ was first measured with an error of approximately 100% from literature value when a portion of the thermal property probe was in direct contact with the sample. However, an additional measurement was taken with the thermal property probe located a short distance from the sample and the approximate error was less than 2%. The inventors of the present discloser believe that the initial error in the $SiO_2$ measurement was due to a parallel path of heat transfer through a fiber optic ferrule of the thermal property probe.

DETAILED DESCRIPTION

Figure 1:
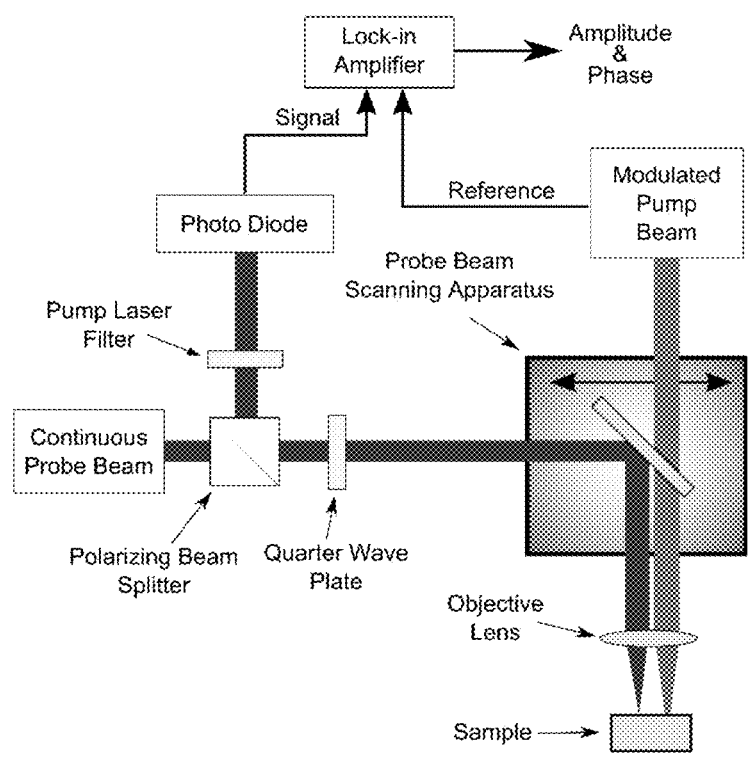
FIG. 1 illustrates a traditional Modulated Optical Reflectance (MOR) configuration.

The present disclosure covers apparatuses and associated methods for measuring the thermal diffusivity of a bulk material that has a reflective surface or coating. In the following description, numerous specific details are provided for a thorough understanding of specific preferred embodiments. However, those skilled in the art will recognize that embodiments can be practiced without one or more of the specific details, or with other methods, components, materials, etc. In some cases, well-known structures, materials, or operations are not shown or described in detail to avoid obscuring aspects of the preferred embodiments. Furthermore, the described features, structures, or characteristics may be combined in any suitable manner in a variety of alternative embodiments. Thus, the following more detailed description of the embodiments of the present invention, as illustrated in some aspects in the drawings, is not intended to limit the scope of the invention, but is merely representative of the various embodiments of the invention.

In this specification and the claims that follow, singular forms such as "a," "an," and "the" include plural forms unless the content clearly dictates otherwise. All ranges disclosed herein include, unless specifically indicated, all endpoints and intermediate values. In addition, "optional", "optionally", or "or" refer, for example, to instances in which subsequently described circumstance may or may not occur, and include instances in which the circumstance occurs and instances in which the circumstance does not occur. The terms "one or more" and "at least one" refer, for example, to instances in which one of the subsequently described circumstances occurs, and to instances in which more than one of the subsequently described circumstances occurs.

The present disclosure covers methods, compositions, and an apparatus for measuring the thermal diffusivity of a bulk material with a fiber-based thermal property probe. In embodiments, the probe is a modulated optical reflectance (FB-MOR) system that allows for offset pump and probe measurement techniques to be used. In embodiments, the pump and probe are held at a fixed, known separation distance, and the phase is measured for various frequencies. This disclosure will briefly discuss the thermal wave theory used in this study, details of the experimental apparatus, and the experimental results will be shown with a discussion of possible improvements on the technique.

MOR Theory

In embodiments, the theory used in this disclosure is based on periodically heating a solid in one location and detecting the temperature fluctuations a known distance away from the heating location. Specifically, in the modulated optical reflectance (MOR) technique, the heating is conducted by a "pump" laser transmitted through a "pump" fiber, and the temperature is detected with a "probe" laser, transmitted through a "probe" fiber.

Other embodiments for measuring the temperature of a surface may also be used. For example, a probe fiber may transmit fluorescence radiation emitted by a sample as a result of shorter-wavelength radiation incident on the sample and as a function of the temperature of the sample. The amount of fluorescence radiation may be measured to determine the temperature modulation of the sample. However, some sample materials will not easily fluoresce. In these cases, a nano-particle layer that readily fluoresces may be added to the surface of the sample. Typically, a nano-scale thickness will not negatively impact the thermal properties of the sample so as to introduce error into a thermal conductivity or thermal diffusivity measurement.

In other embodiments, the temperature modulation of a sample may be measured through IR emission from the sample. Additionally, a sample's temperature may be measured through Raman spectroscopy techniques.

In some samples, the temperature may be measured indirectly through the bulging of the surface as the sample is heated. A bulging surface, or a change in surface properties, may be measured with an interferometer.

Various types of fibers and fiber materials may be used as pump or probe fibers. For example, a fiber-optic cable may be either a single-mode or multi-mode fiber optic. The fiber may be made of fused silica or, in higher-temperature applications, the fiber material may be sapphire. A sapphire fiber material has the advantage of measuring thermal properties of a sample at higher temperatures, for example, approximately 1000° C. A Sapphire fiber material may also be used to measure thermal properties over a wider temperature range as the thermal properties of most materials change as a function of temperature.

In embodiments, any optical wavelength that can be transmitted through a fiber may be used to heat a sample. Typically, these wavelengths range from the infrared (IR) to the ultra-violet (UV). Similarly, any optical wavelength that can be transmitted through a fiber may be used to detect a sample's temperature. In a reflectivity embodiment, since the reflectivity of a sample changes with temperature, the reflection of the probe beam from the sample is modulated by the temperature of the sample. Therefore, the temperature modulation can be determined by observing the magnitude of oscillation of the probe beam after it has been reflected from the sample surface.

Previous techniques by the inventors of the present disclosure used a pump and probe laser separated by a distance and varied the modulation frequency to measure thermal properties in bulk samples. The details of this technique can be seen in Z. Hua et al., The study of frequency-scan photothermal reflectance technique for thermal diffusivity measurement, Review of Scientific Instruments, 86 (2015) 054901, which is incorporated by reference in its entirety. The primary focus of embodiments of the present disclosure is to adapt the laser technique into a fiber-based configuration.

However, for completeness, sufficient theory will be described here to be able to interpret the results obtained in the inventors' study. Other solutions exist. See A. Feldman, Algorithm for solutions of the thermal diffusion equation in a stratified medium with a modulated heating source, High Temperatures. High Pressures, 31 (1999) 293-298; D. Maillet, Thermal quadrupoles: solving the heat equation through integral transforms, John Wiley & Sons Inc, 2000; A. Salazar et al., Simultaneous measurement of thermal diffusivity and optical absorption coefficient using photothermal radiometry. II Multilayered solids, Journal of Applied Physics, 110 (2011) 033516; and A. J. Schmidt et al., A frequency-domain thermoreflectance method for the characterization of thermal properties, Review of Scientific Instruments, 80 (2009) 094901.

Figure 2:
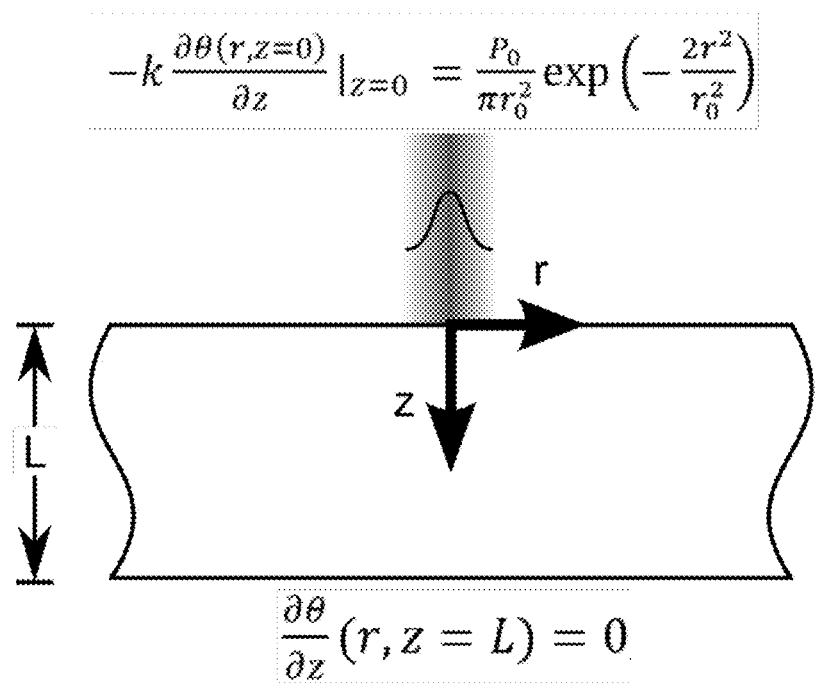
FIG. 2 illustrates a sample coordinate system and boundary conditions.

FIG. 2 illustrates a theoretical sample along with boundary conditions. To discuss the theory, we will begin with the Fourier transformed, cylindrical heat conduction equation:

$$\frac{1}{r}\frac{\partial}{\partial r}\left(r\frac{\partial \theta}{\partial r}\right) + \frac{\partial^2 \theta}{\partial z^2} - \frac{i\omega}{\alpha}\theta = 0. \quad \text{Equation 1}$$

In this notation, r is the radial coordinate, $\theta$ is the Fourier transform of the temperature, z is the depth coordinate, $\omega$ ($\omega=2\pi f$) is the angular frequency, $\alpha$ is the thermal diffusivity, and i is the imagery number defined by $\sqrt{-1}$.

We consider the sample to be semi-infinite in the radial direction with a Gaussian flux condition centered at r=0 and absorbed at the surface (z=0), and an insulated boundary condition at z=L, then the boundary conditions can be given mathematically by:

$$\frac{\partial \theta}{\partial z}(r, z = L) = 0, \quad \text{Equation 2}$$

and $$-k\frac{\partial \theta(r, z = 0)}{\partial z}\bigg|_{z=0} = \frac{P_0}{\pi r_0^2}\exp\left(-\frac{2r^2}{r_0^2}\right). \quad \text{Equation 3}$$

Where k is the thermal conductivity, $P_0$ is the laser power, L is the thickness of the sample, and $r_0$ is the radius where the heating is $1/e^2$ of the maximum heating. The solution for a homogenous sample given by $$\theta_0(r, z = 0) = \frac{P_0}{4\pi}\int_0^\infty u J_0(ru)Z(u)e^{-\frac{u^2 r_0^2}{8}}du \quad \text{Equation 4}$$

can be found using the quadrupoles method described by D. Maillet (reference above) with a Hankel transform, where Z is considered the thermal impedance and is defined as:

$$Z(u) = \frac{\cosh(\sigma L)}{k\sigma \sinh(\sigma L)} \quad \text{Equation 5}$$

and $\sigma$ is the thermal wave number and is defined as:

$$\sigma = \left(\frac{1+i}{\mu} + u\right)^{1/2}. \quad \text{Equation 6}$$

In this solution $J_0$ is the Bessel function and u is the Hankel variable. The thermal diffusion length, $\mu$ is defined by:

$$\mu = \sqrt{\alpha/\pi f}. \quad \text{Equation 7}$$

The thermal diffusion length is useful because it indicates the depth to which the oscillatory temperature travels. Furthermore, since the thermal diffusion length is frequency dependent it can be controlled experimentally.

If the laser radius is much smaller than the thermal diffusion length, and the sample is much thicker than the thermal diffusion length, then the laser can be treated as a periodic point source on a semi-infinite medium. In this scenario, the Fourier transform of the temperature distribution is given by:

$$\theta_0(r) = \frac{P_0}{2} \frac{e^{-(1+i)r/\mu}}{2\pi k r} \quad \text{Equation 8}$$

When the pump beam is small enough such that Equation 4 and REF _Ref441571671 \h \*MERGEFORMAT Equation 8 are equivalent, the spatial relationship of phase is determined by the complex exponential. Specifically, the phase, Ø, may be determined by the relationship between the radial location and the thermal diffusion length, $$\phi = -\frac{r}{\mu} = -r\sqrt{\frac{\pi f}{\alpha}} \quad \text{Equation 9}$$

The derivative of the phase with respect to the square root of frequency results in:

$$\frac{d\phi}{d\sqrt{f}} = -r\sqrt{\frac{\pi}{\alpha}} \quad \text{Equation 10}$$

Solving for thermal diffusivity yields:

$$\alpha = \frac{\pi}{\left(-\frac{d\phi}{d\sqrt{f}}/r\right)^2} \quad \text{Equation 11}$$

Figure 3:
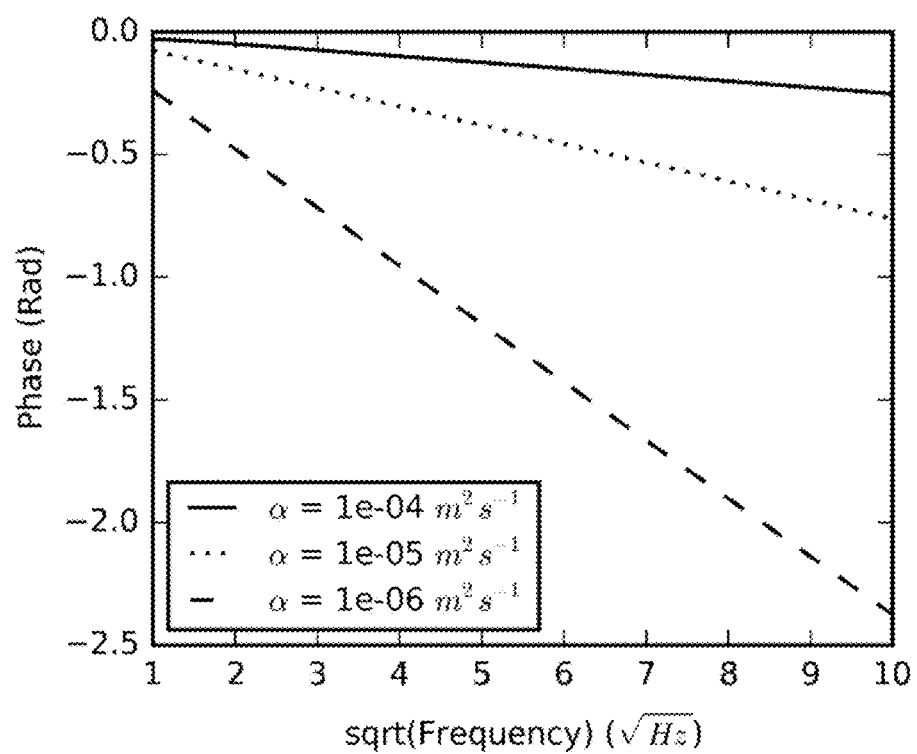
FIG. 3 illustrates theoretical plots of the temperature phase vs. frequency for diffusivities from 1e-4 to 1e-6 m2/s located 135 µm away from a point heat source.

The derivative of phase with respect to frequency can be found by measuring the phase at different frequencies, and then performing a least square fit to the phase vs square root of frequency data. This is the measurement technique that was exploited in the experimental procedure of this configuration. Using Equation 8, a theoretical plot of the phase vs. square root of frequency of materials with diffusivities ranging from $10^{-4}$ to $10^{-6}$ m$^2$/s is shown in FIG. 3.

In this research, Equation 8 is assumed to be a good approximation for REF _Ref424587732 \h \* MERGEFORMAT Equation 4. In the results section this assumption is explored, including its possible effects on the results based on the experimental design.

The following experimental setup and examples are illustrative only and are not intended to limit the disclosure in any way.

EXPERIMENTAL SETUP AND EXAMPLES

Previous attempts in developing a fiber-based MOR system have led to systems where the pump and probe beams are contained in the same fiber. Embodiments of the present disclosure maintain the probe and pump beams in separate fibers.

Equation 8 shows that the amplitude of thermal waves decays rapidly with respect to distance from the source. Specifically, the proportionality can be described as:

$$Amp(\theta) \propto \frac{e^{-r/\mu}}{r}. \quad \text{Equation 12}$$

Therefore, it is important to minimize the separation distance between the pump and probe beams to maximize the signal to noise ratio of the system. Equation 11 illustrates that any error in the separation distance will propagate squared to the diffusivity calculation. Thus, it is necessary to know the separation distance between the pump and probe beams transmitted through their separate fibers to determine the thermal properties. Due to this sensitivity, it is advantageous that this separation distance is maintained constant and can be determined.

Figure 4:
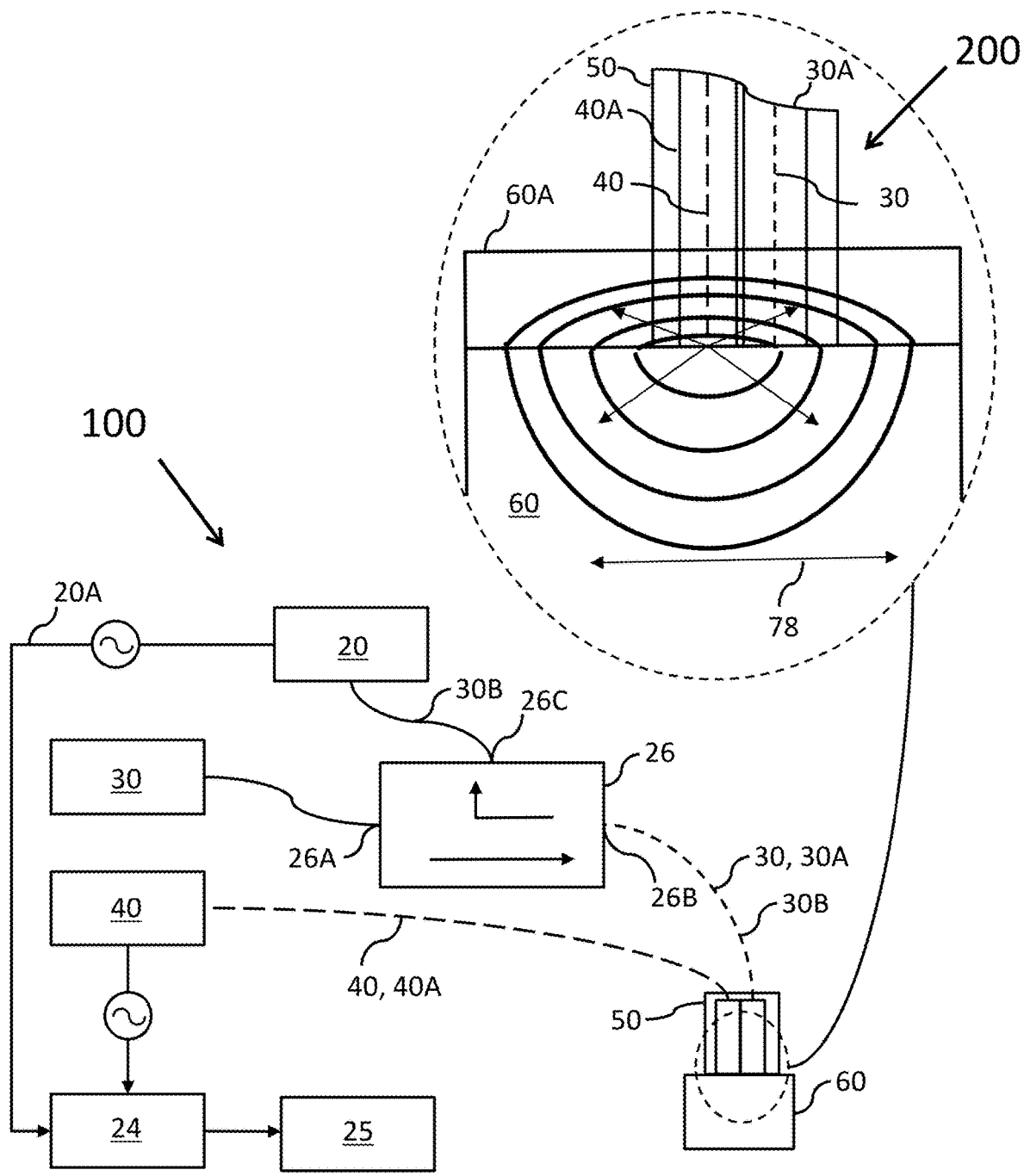
FIG. 4 illustrates a fiber-based MOR system according to embodiments of the present disclosure.

FIG. 4 illustrates a fiber-based MOR system. In embodiments, a fiber-based MOR system 100 uses two lasers: a green laser (532 nm Laser Quantum, Gem) and a red laser (660 nm Laser Quantum, Lux). The green laser is used as the pumping laser or pump beam 40, and the red laser is used as the probe laser or probe beam 30. The pump beam 40 is transmitted through the pump beam fiber optic 40A and the probe beam 30 is transmitted through the probe beam fiber optic 30A. In this example, the pump laser 40 is modulated directly, and the probe laser 30 is set at a constant power level. The modulated pump beam 40 travels directly to the sample 60 heating its surface 60A. The probe beam 30 enters the fiber circulator 26 in port 26A and exits port 26B on its way to the sample 60. After reflecting off the sample surface 60A, the reflected beam 30B travels back through the same fiber into the fiber circulator 26 entering in port 26B and exiting port 26C where it will travel to the photodetector 20. In embodiments, the detector signal 20A is measured using a lock-in amplifier 24 with the reference signal set by the pump beam 40 modulation. The lock-in-amplifier 24 outputs a signal amplitude and phase 25. Since the entire system is fiber based, several optical elements are eliminated that are normally employed for retrieving the reflected beam 30B signal thereby simplifying the system and experimental setup. This design feature eliminates the cost and signal loss associated with those components in addition to their required alignment procedures.

FIG. 4 also illustrates a close-up view of thermal property probe 200. Where the pump 40 and probe 30 beams come together at the sample 60, the beams 30 and 40 they need to be positioned securely in the same location, usually in close proximity, and typically normal to the sample 60. In embodiments, and in the inventors' experiments, this was done by mounting both fibers into a single ceramic ferrule 50.

Figure 5A:
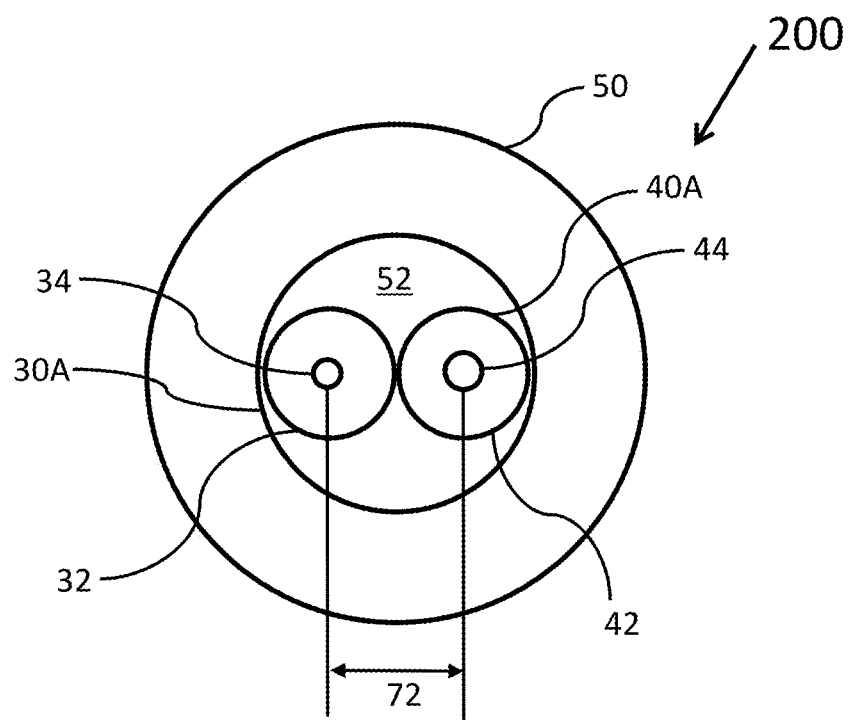
FIG. 5A illustrates a schematic of an optical fiber head with both pump and probe fibers according to embodiments of the present disclosure.
Figure 5B:
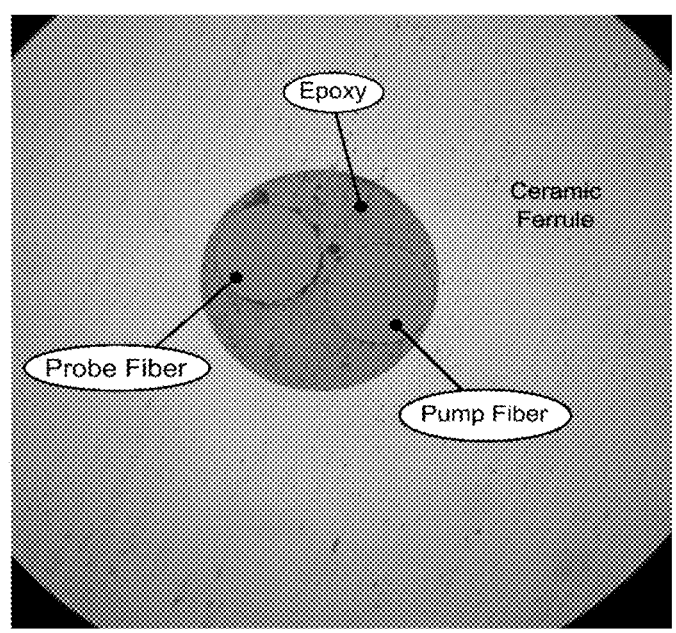
FIG. 5B is a black and white photo of an example optical fiber head as viewed under a microscope.

FIG. 5A illustrates an end view of thermal property probe 200. In this example, the ceramic ferrule 50 had an inner diameter of 270 µm and both fibers (30A and 40A) had an outer cladding diameter of 125 µm. Furthermore, FIG. 5B illustrates a microscopic view of the end of the thermal property probe 200, illustrated in FIG. 5A. Epoxy 52 surrounds and holds both the pump 40A and probe 30A fibers into a ceramic ferrule 50. The inventors used the image in FIG. 5B, together with image processing software, to determine the center-to-center distance 72 of the fibers (30A and 40A). In this example, the center-to-center distance 72 was measured to be approximately 139 µm, which remained fixed throughout the experimental measurements. Additionally, the pump 40A and probe 30B beam fibers had pump core 44 and probe core 34 diameters of 9.5 µm and 4.5 µm, respectively.

Other thermal property probe configurations may be used to measure thermal properties of a sample. FIGS. 5A and 5B show one specific example of the relative positions and sizes of a pump core 44, pump cladding 42, probe core 34, and probe cladding 32. In other embodiments, the pump 44 or probe 34 cores may be larger or smaller than what is depicted in FIGS. 5A and 5B. For example, it may be advantageous in some applications to use a smaller pump core 44, pump cladding 42, probe core 34, and probe cladding 32 with a smaller detection site. The ability to measure very small samples, for example, on the order of the size of a grain of sand or even much smaller (such as 10 µm×10 µm), can be advantageous for measuring the thermal properties of hazardous materials, for example, radioactive materials. A very small radioactive sample can be transported and tested without adverse safety or security risks. Measuring small samples also has the advantage of requiring less power from a pump laser to heat and then measure the thermal characteristics of a sample. High-intensity heat may negatively impact or otherwise damage a sample.

Figure 5C:
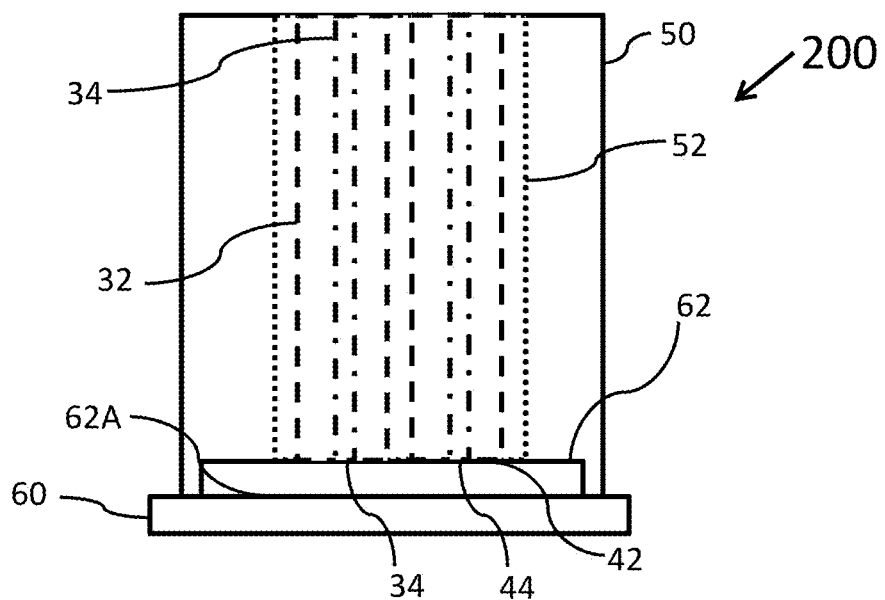
FIG. 5C illustrates an elevation view of the optical fiber head shown in FIG. 5A.

FIG. 5C illustrates an elevation view of the measurement end of the thermal property probe 200. In this embodiment, the thermal property probe 200 is placed directly on top of and in contact with the sample 60, or on the sample's surface 60A. A gap 62 is formed between the sample 60 and the thermal property probe 200 that may be filled with an inert gas or air, or may be evacuated to create a vacuum. A gap, such as gap 62, between the sample surface 62A and other portions of the thermal property probe 200 may help prevent alternate heat transfer paths between the pump 44 and probe cores 34 that could lead to errors in thermal property measurements. In other words, a gap 62 may prevent heat being transferred through the pump 44 and probe cores 34 leading to inaccurate thermal property measurements.

Figure 5D:
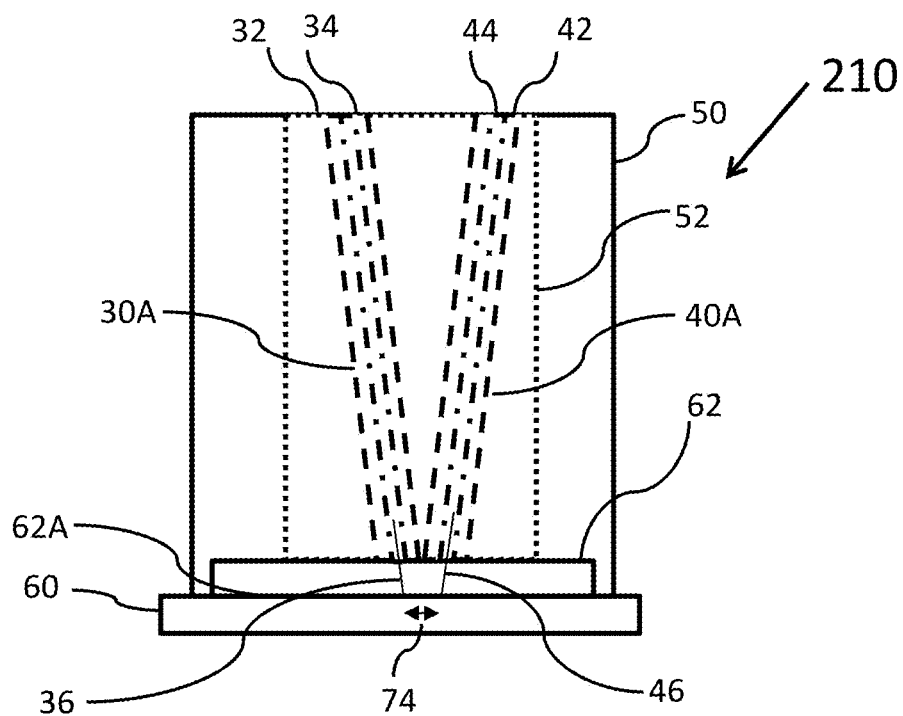
FIG. 5D illustrates an elevation view of another embodiment of an optical fiber head according to embodiments of the present disclosure.

FIG. 5D illustrates another thermal property probe embodiment 210 where the pump 40A and probe 30A fibers are secured in an epoxy 52 and angled near the end of the probe 210 such that the distance 74 between the pump light path or pump radiation 46 and probe light path or probe radiation 36 incident on the sample, or the heat path distance 74 on surface 62A is significantly reduced. In embodiments, the heat path distance 74 is less than 10 µm to enable the measurement of very small samples, such as radioactive samples that can be very small to allow for shipping and handling without safety or security concerns.

Figure 5E:
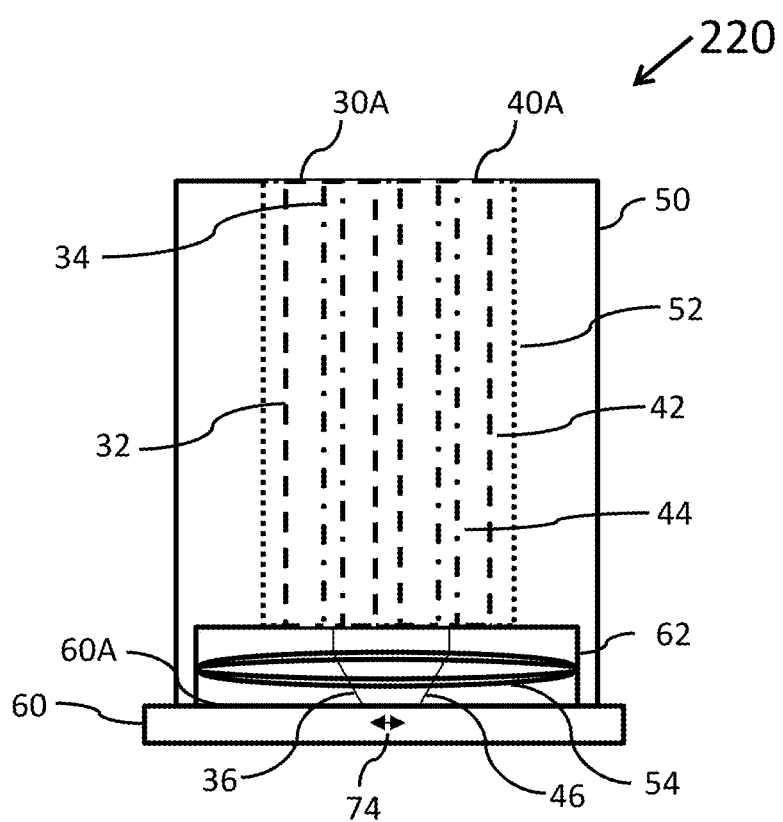
FIG. 5E illustrates an elevation view of another embodiment of an optical fiber head according to embodiments of the present disclosure.

FIG. 5E illustrates another thermal property probe embodiment 220 where light coming from the pump 40A and probe 30A fibers is angled through a focusing lens 54 between the pump 40A and probe 30A fibers and the sample 60 such that the distance between the pump light path or pump radiation 46 and probe light path or probe radiation 36 incident on the sample surface 60A is significantly reduced. As described in other embodiments, this also has the advantage of measuring very small sample sizes. In embodiments, the heat path distance 74 is less than 10 µm.

Figure 6A:
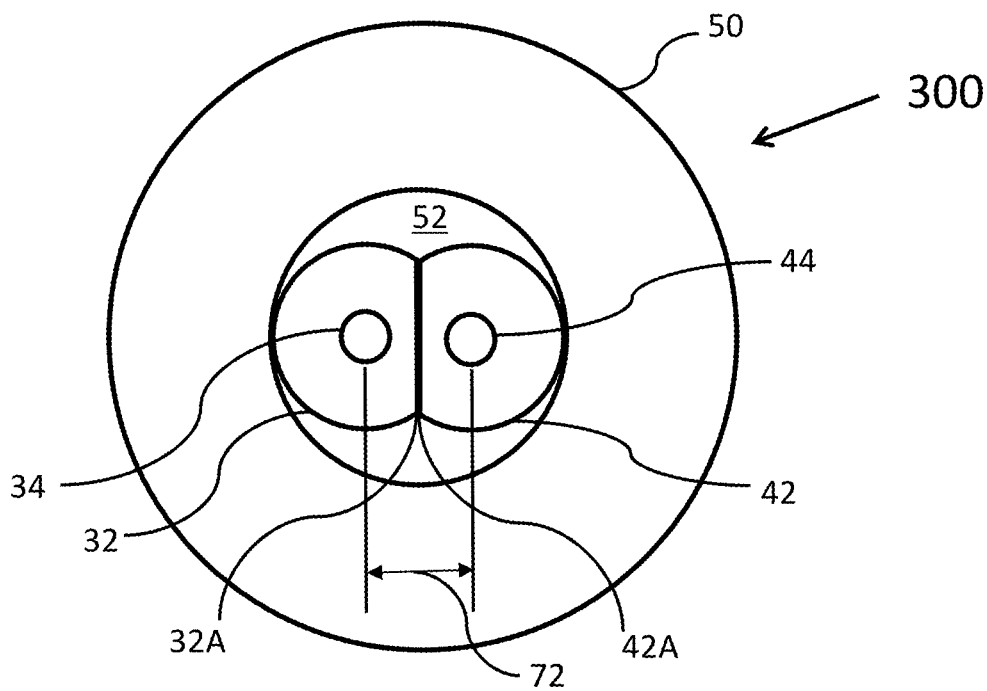
FIG. 6A illustrates a schematic of another optical fiber head with both pump and probe fibers according to embodiments of the present disclosure.
Figure 6B:
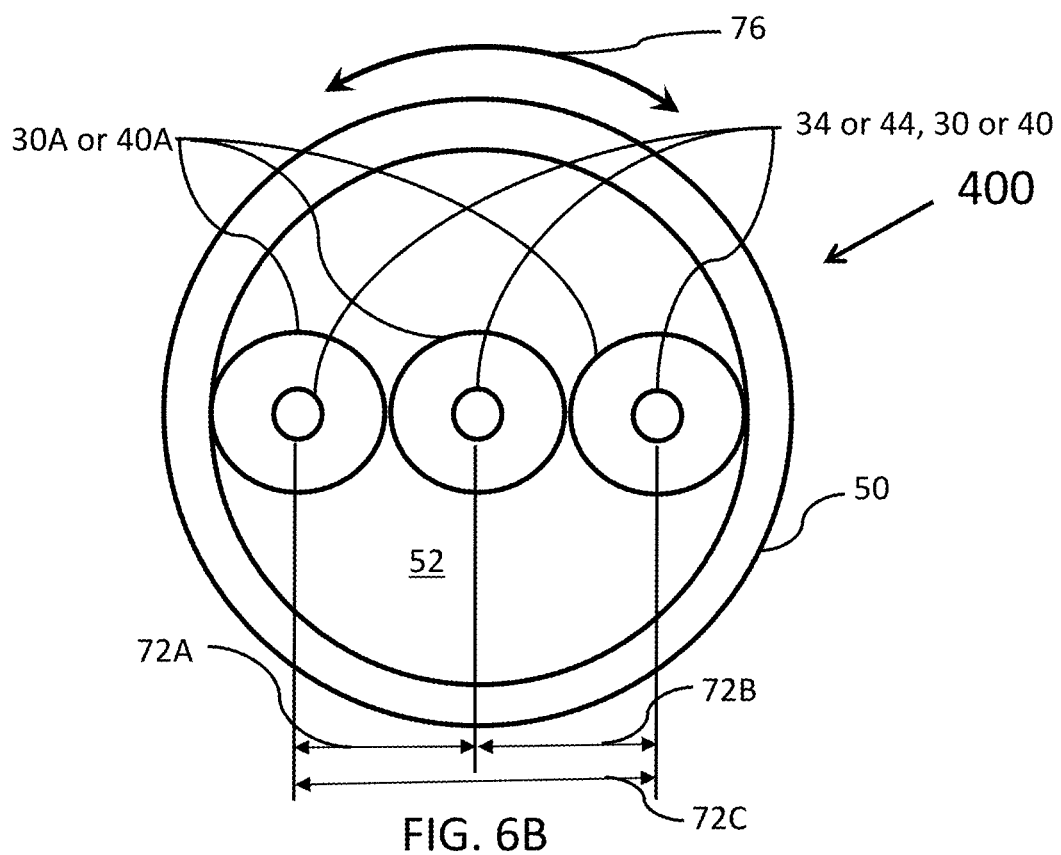
FIG. 6B illustrates a schematic of another optical fiber head with both pump and probe fibers according to embodiments of the present disclosure.

FIGS. 6A and 6B illustrate, through a plan view, other embodiments or configurations of a thermal property probe 300 and 400, respectively. In FIG. 6A, a portion of the cladding (42A and 32A) from both the pump cladding 42 and the probe cladding 32 has been removed to place the pump core 44 and probe core 34 closer together. As in previous embodiments, the distance between the pump core 44 and the probe core 34 is known and fixed in epoxy 52 or other securing material. This type of configuration allows for the measurement of a smaller sample size. In embodiments, the center-to-center distance 72 between the pump core 44 and the probe core 34 is less than 10 µm.

In FIG. 6B, a series of pump 40A or probe 30A fibers (shown as pump core 44 and probe core 34) are placed roughly linearly (along a line in a plan-view perspective) within an epoxy 52, a ceramic paste, or another securing material. In this illustrated arrangement, the heat path distances 72A or 72B are roughly half the distance of the heat path distance 72C.

Other placements for the pump 40A or probe 30A fibers are also possible. For example, the pump 40A or probe 30A fibers may be bundled into a triangle shape or other arrangement that may be convenient for fixing the pump 40A or probe 30A fibers into the ferrule 50.

The three fibers transmitting the pump 40 or probe 30 beams or signals may be interchanged between pump 40A or probe 30A fibers by changing the source pump 40 or probe 30 laser. As in previous embodiments, the center-to-center distance 72 between the various cores (44 or 34) is known and fixed. In this embodiment, the ceramic ferrule 50, together with the pump 40A and probe fibers 30A, may be rotated a rotation distance 76 during operation to determine whether a sample has different thermal properties depending on its angular orientation relative to the pump 40A or probe 30A fibers. While FIG. 6B shows three fibers, other linear configurations are possible. For example, a thermal properties probe may have four, five, ten, or more fibers arranged in different configurations.

Figure 7:
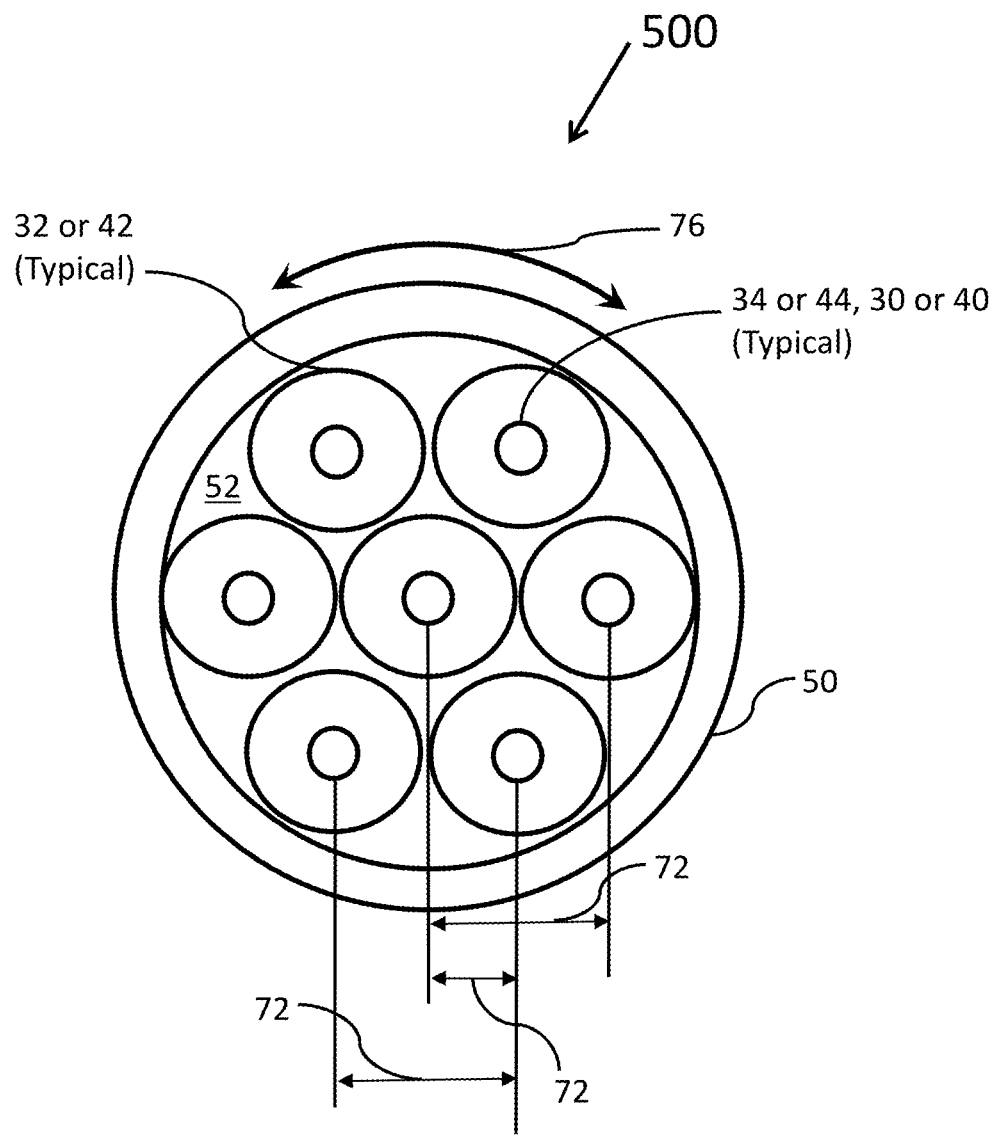
FIG. 7 illustrates a schematic of another optical fiber head with both pump and probe fibers according to embodiments of the present disclosure.

FIG. 7 illustrates another configuration of another thermal properties probe 500. As illustrated, only one pump cladding 42, pump core 44, probe cladding 32, and probe core 34 is labeled, although all the similar-sized circle shapes in the figure may be either pump 42 or probe 32 cladding, or, pump 44 or probe 34 cores. As in other embodiments, the fibers transmitting the pump 40 or probe 30 beams or signals may be interchanged between pump or probe fibers (40A or 30A) by changing the source from a pump 40 to a probe laser 30 or a probe 30 to a pump laser 40. This interchange between pump 40A or probe fibers 30A may be performed through a multiplexer (not shown) on the pump 40A and probe 30A fibers.

As in previous embodiments, the distance 72 between the various pump 44 or fiber 34 cores is known and fixed. Only a few distances 72 are labeled in FIG. 7. Additionally, the ceramic ferrule 50, together with the pump 40A and probe 30A fibers, may be rotated a rotation distance 76 during operation to determine whether a sample, e.g., sample 60 shown in other figures, has different thermal properties as a function of its orientation. In an alternative embodiment, the ceramic ferrule 50, together with the pump 40A and probe 30A fibers, may be fixed relative to a source beam (e.g., probe beam 30 or pump beam 40) or fixed relative to the sample 60 and different pump 40A and probe 30A fibers may be operated creating different thermal heat paths across a sample wherein the thermal properties of the sample may be measured as a function of orientation or direction. Thermal properties probe 500 in FIG. 7, as with other embodiments with multiple pump and probe fibers, may have greater accuracy in determining the thermal properties of a sample 60 because more measurements may be taken across the same sampling area within a single measurement operation.

In operation, a thermal property probe (200 through 500) of any of the previous embodiments may be moved across a sample at measurement intervals (shown and intervals 78 in FIG. 4). In embodiments, intervals 78 may be less than 10 µm. to be able to measure differences or thermal property variations in a single sample 60 across intervals 78. In addition, this measurement technique can help determine average thermal properties and thermal property variation within an entire sample. Such a technique may be used, for example, to find defects in a sample that exhibits variation in thermal properties caused by defects in the sample.

EXPERIMENTAL PROCEDURE

Through the development of this technique, the ferrule (such as ferrule 50 shown in embodiments) was brought into close proximity to the sample (such as sample 60 shown in embodiments) in some cases, and in others it was brought into contact with the sample. Both these techniques show promise, but the data presented here is from the technique where the tip of the thermal property probe (such as thermal property probe 200 through 500) was brought into contact with the sample. The inventors performed this procedure by using a mechanical stage driven by a micrometer and observed the process under a microscope. The microscope evaluation helped the inventors ensure that the ferrule tip was normal to the sample surface and that the tip was contacting the sample surface.

Once the fiber ferrule was in position, the signal from the detector at the modulation frequency was measured using the lock-in amplifier (such as lock-in amplifier 24 shown in FIG. 4). The signal was then measured over a range of frequencies. For calibration purposes, the modulated pump laser was measured directly using the photodetector and the lock-in amplifier. The phase data obtained from this measurement was subtracted from the phase obtained when measuring the probe beam in the experimental configuration. This step removed the response of the system ensuring that that any phase difference after the subtraction was due to the thermal response of the sample.

After performing the frequency scan, the data reduction was performed by plotting the phase against the sqrt(f), similar to FIG. 3. A linear fit was performed to obtain the slope of the data, and was used with Equation 10 to directly determine thermal diffusivity of the sample.

EXPERIMENTAL RESULTS

As discussed previously, the inventors of the present disclosure assumed that the heating spot was small compared to the separation distance between the pump and probe, and that the heating spot was much smaller than the thermal diffusion length. Under these assumptions, \*MERGEFORMAT Equation 4 and REF _Ref441571671 \h \* MERGEFORMAT Equation 8 yield the same results. To test the accuracy of this assumption, a comparison between the two equations was conducted for beam diameters of 9.5 µm, 20 µm, 50 µm, and 100 µm. The inventors conducted the comparison using a separation distance of 139 µm and a sample with a thermal diffusivity of $1\times10^{-5}$ m/s². From these comparisons, which can be seen in FIG. 8, the inventors determined that the point source approximation is reasonable for pump beam diameters that are less than approximately 20 µm.

Figure 8:
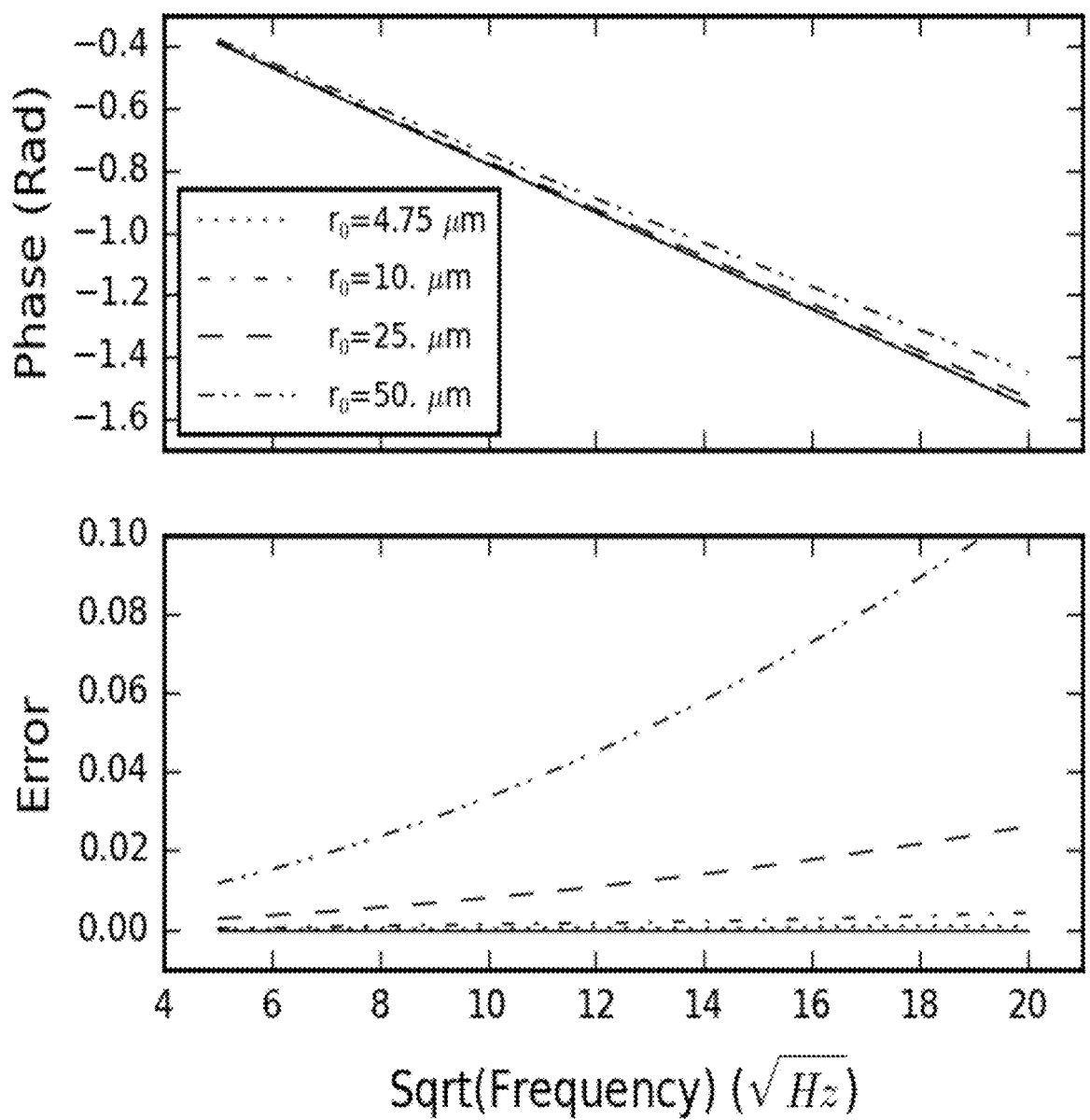
FIG. 8 illustrates the phase vs. the square root of frequency for 4 different beam sizes according to embodiments of the present disclosure.

A least squares fit was performed to determine the slope for each data set in FIG. 8. Using the slopes from the fitting lines, the thermal diffusivity was calculated using \* MERGEFORMAT Equation 11. The results for each beam size and the relative error are presented in Table 1. Table 1 shows that the error introduced by the point source assumption in this study introduced less than 0.2% error in the results. Therefore, under these conditions it was considered an accurate assumption.

In Table SEQ Table \* ARABIC 1, below, the slopes are provided from a least squares fit from the data in FIG. 8 for each beam radius. Using the fitted slopes, the thermal diffusivity was calculated using \* MERGEFORMAT Equation 11, and the relative error from the true value is reported.

TABLE 1

| Beam Radius (µm) | Fitted Slope | Diffusivity (m²/s) | Relative Error (%) |
|---|---|---|---|
| 4.75 | 0.0779 | 1.001e−5 | 0.15% |
| 10 | 0.0777 | 1.006e−5 | 0.62% |
| 25 | 0.0763 | 1.039e−5 | 3.9% |
| 50 | 0.0717 | 1.179e−5 | 17.9% |

Figure 9:
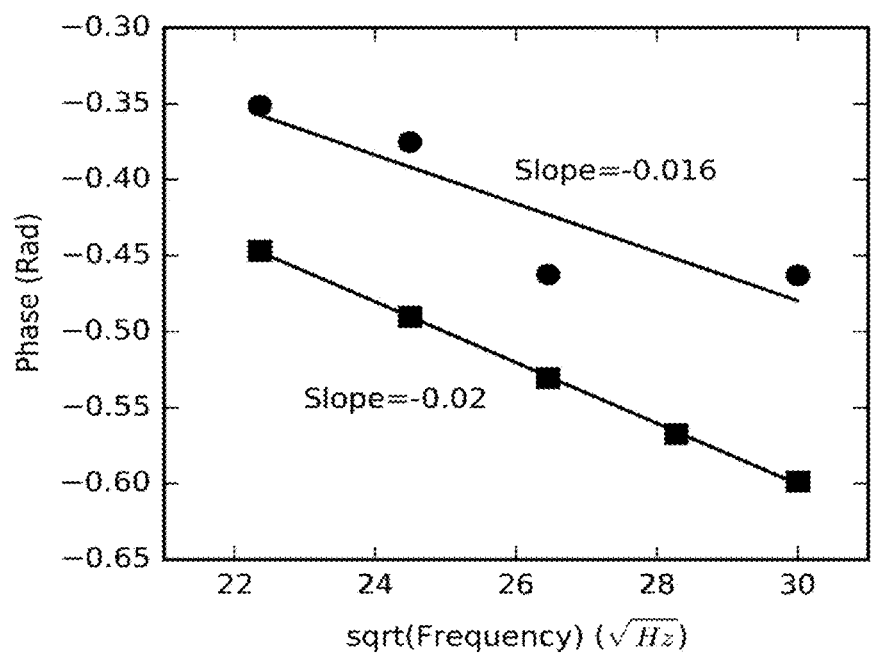
FIG. 9 illustrates experimental phase data vs. square root of frequency plotted for two different sets of data on a SiC sample coated with 200 nm of titanium.
Figure 10:
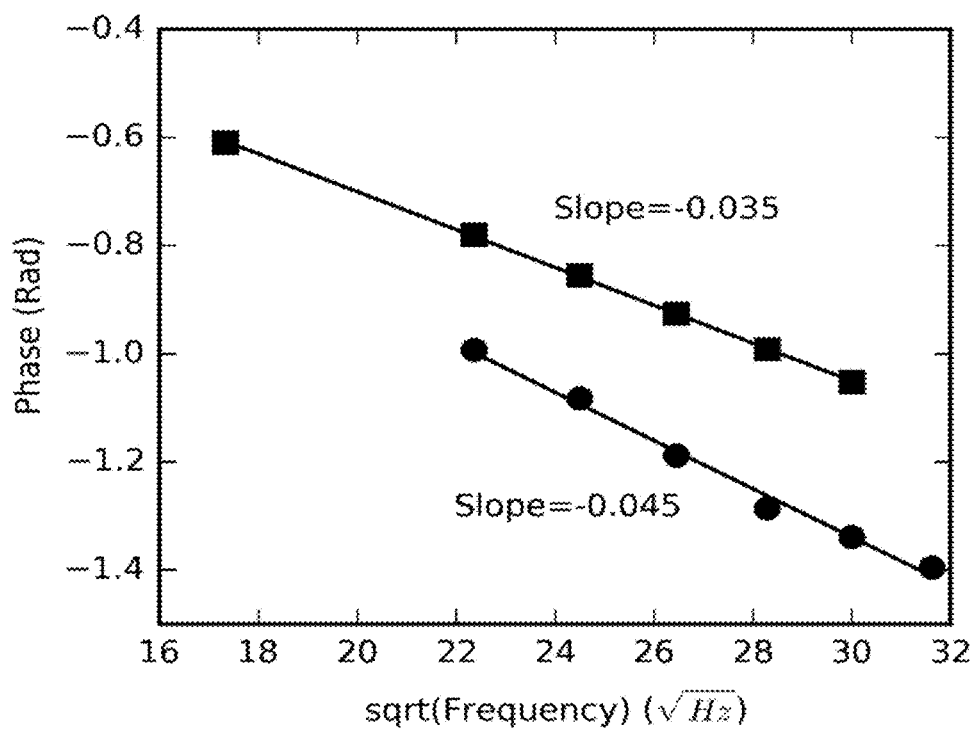
FIG. 10 illustrates experimental phase data vs square root of frequency plotted for two different sets of data on a germanium sample coated with 200 nm of titanium.
Figure 11:
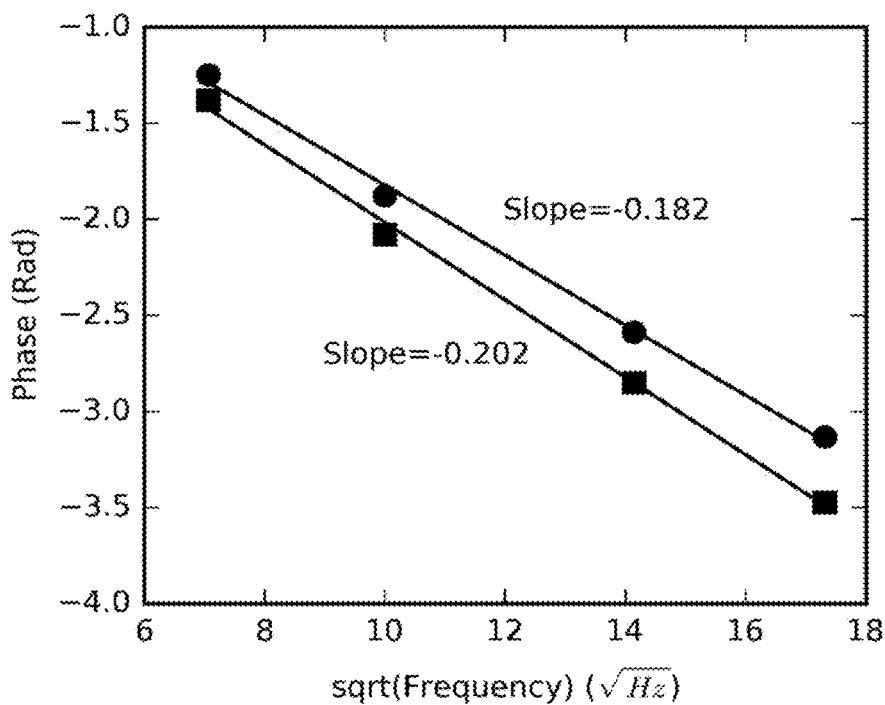
FIG. 11 illustrates experimental phase data vs square root of frequency plotted for two different sets of data on a Glass sample coated with 200 nm of titanium.
Figure 12:
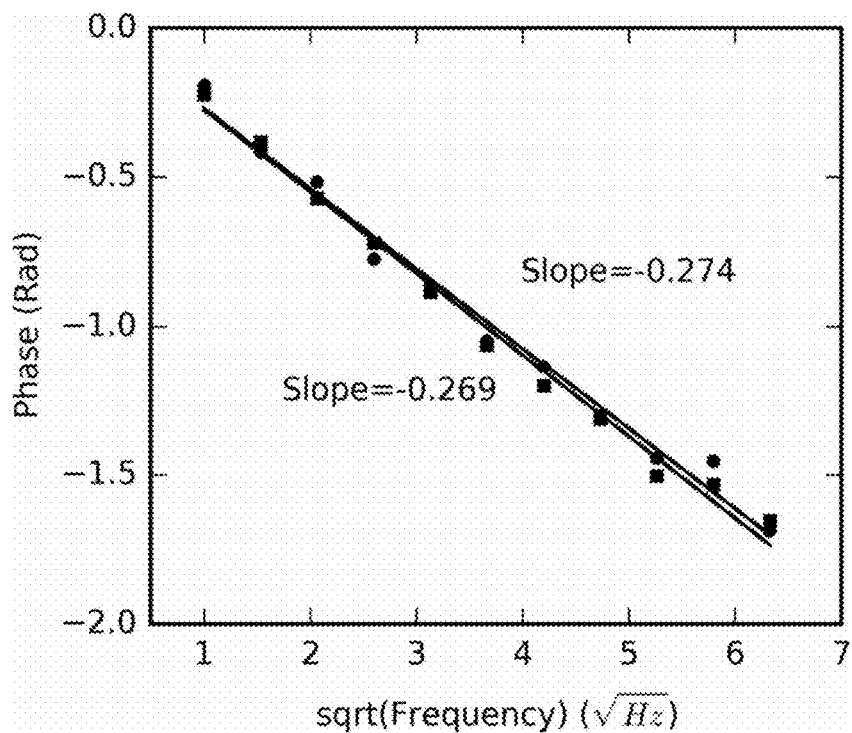
FIG. 12 illustrates experimental phase data vs. square root of frequency plotted for two different sets of data from a silicon dioxide sample coated with 200 nm of titanium.

In this study the thermal diffusivity of Germanium (Ge), Silicon Carbide (SiC), and Silicon dioxide ($SiO_2$), were experimentally measured using the process discussed earlier. The data was collected by bringing the fiber ferrule into contact with the surface of the sample. This technique proved to be more repeatable and provided a larger signal than positioning the sample a few microns away from the sample. The data collected can be seen in FIGS. 9, 10, and 11, along with the linear fits to the data that were used to extract the thermal diffusivity of each sample.

Each of these samples were coated with 200 nm of titanium to ensure the absorption/reflection occurred at the surface of the sample. The modulation frequencies used in this study correspond to thermal diffusion lengths range of approximately 30 µm to 250 µm. This means that the shortest thermal diffusion length is still approximately 150 times longer than the thickness of the titanium coating. Therefore, the thermal response of the sample can be approximated by being entirely comprised of the substrate material.

Table 2 provides a summary of the measured slopes from FIGS. 9 to 12, along with the measured value for thermal diffusivity, the literature values, and the relative difference. For each of these calculations a separation distance between the pump and probe of 139 µm was used.

TABLE 1

| | Sample | Slope | Measured Diffusivity (m²/s) | Literature Diffusivity (m²/s) | Relative Difference (%) |
|---|---|---|---|---|---|
| In contact | SiC | 0.018 | $1.87 \times 10^{-4}$ | $1.89 \times 10^{-4}$ | −1.1 |
| In contact | Ge | 0.040 | $3.79 \times 10^{-5}$ | $3.46 \times 10^{-5}$ | 9.5 |
| In contact | $SiO_2$ | 0.192 | $1.65 \times 10^{-6}$ | $8.31 \times 10^{-7}$ | 98.6 |
| 50 µm | $SiO_2$ | 0.271 | $8.2 \times 10^{-7}$ | $8.31 \times 10^{-7}$ | −1.3 |

These results show that this technique had good agreement for both the SiC and Ge samples. However, the results for $SiO_2$ yielded a much higher thermal diffusivity when in contact with the surface. A value much closer to literature values was obtained when the fiber ferrule was approximately 50 µm away from the sample surface. In the model used it is assumed that the boundary condition is a Gaussian heating flux. However, in this measurement it is possible for the heat to transfer through the ferrule tip and back to the sample. This creates another parallel path for the heat to transfer from the pump to the probe. This would make the sample appear to have a higher thermal diffusivity. This phenomenon is most apparent in the $SiO_2$ sample because of its low thermal diffusivity. In the case where the ferrule was not in contact with the sample, this parallel path is not present and the results are in better agreement with literature values.

When measuring a sample of unknown thermal diffusivity, the inventors of the present disclosure recommend measurements be conducted both in contact and out of contact. If little difference is obtained, then the in-contact results have better signal-to-noise ratios and therefore are more precise. If the results obtain different slopes, then the out-of-contact measurement should be used. In future work, a modeling approach to take into account the parallel path of heat transfer could be developed in order to utilize the higher signal-to-noise ratio of the in-contact fiber ferrule, while maintaining the accuracy of the out-of-contact configuration for low-thermal diffusivity materials.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A fiber-based thermal property probe, comprising:
    a pump beam source that is configured to transmit a pump beam through a pump fiber, the pump beam being configured to heat a sample at its surface and the pump fiber having a pump fiber sample end;
    a probe beam source that is configured to transmit a probe beam through a probe fiber, the probe beam being configured to measure the temperature of the sample surface and the probe fiber having a probe fiber sample end;
    a ferrule configured to hold the pump and the probe fiber sample ends at a fixed, known separation distance from each other;
    wherein the pump beam and the probe beam, when incident on the sample surface, create a heat path distance at the sample surface that is the distance between the pump beam and the probe beam, when incident on the sample surface.

2. The fiber-based thermal property probe of claim 1, wherein the pump beam source is configured to modulate the pump beam and the probe beam source is configured to provide the probe beam continuously.

3. The fiber-based thermal property probe of claim 1, wherein the pump and the probe sample ends are angled to point towards each other such that the heat path distance is less than a center-to-center distance between the pump and the probe fibers.

4. The fiber-based thermal property probe of claim 1, wherein a portion of the pump and the probe fiber is removed at the pump and the probe fiber sample ends such that the heat path distance is less than a center-to-center distance between the pump and the probe fibers.

5. The fiber-based thermal property probe of claim 1, wherein the thermal property probe is a modulated optical reflectance system.

6. The fiber-based thermal property probe of claim 1, wherein the probe fiber measures the temperature of the sample through optical fluorescence.

7. The fiber-based thermal property probe of claim 1, wherein the probe fiber measures the temperature of the sample through Raman spectroscopy techniques.

8. The fiber-based thermal property probe of claim 1, wherein the probe fiber measures the temperature of the sample by measuring a change in the sample's surface properties.

9. The fiber-based thermal property probe of claim 1, wherein the ferrule, when in contact with the sample surface, forms a gap between the sample surface and the pump and the probe fiber sample ends.

10. The fiber-based thermal property probe of claim 9, further comprising a focusing lens placed between the pump and the probe fiber sample ends and the sample surface and configured to reduce the heat path distance that is less than a center-to-center distance between the pump and probe fibers at the pump and the probe fiber sample ends.

11. The fiber-based thermal property probe of claim 1, wherein:
    the pump fiber is a first fiber;
    the probe fiber is a second fiber;
    the fiber-based thermal property probe comprises a third fiber;
    the first, second, and third fibers are fixed in the ferrule;
    the first, second, and third fibers are each configured to transmit either the pump beam or the probe beam to the sample surface, the pump or the probe beam transmitted through the first fiber is the first beam, the pump or probe beam transmitted through the second fiber is the second beam; and the pump or the probe beam transmitted through the third fiber is the third beam;
    the distance between the first beam and the second beam, when incident on the sample surface, is a first heat path distance at the sample surface that is the distance between the first beam and the second beam, when incident on the sample surface, and one of the first beam or the second beam is the pump beam and the other of the first beam or the second beam is the probe beam;
    the distance between the second beam and the third beam, when incident on the sample surface, is a second heat path distance at the sample surface that is the distance between the second beam and the third beam, when incident on the sample surface; and one of the second beam or the third beam is the pump beam and the other of the second beam or the third beam is the probe beam;
    the distance between first beam and the third beam, when incident on the sample surface is a third heat path distance at the sample surface that is the distance between the first beam and the third beam, when incident on the sample surface, and one of the first beam or the third beam is the pump beam and the other of the first beam or the third beam is the probe beam; and
    each of the first, second, and third heat path distances are fixed and known.

12. The fiber-based thermal property probe of claim 11, wherein:
    the first, second, and third fibers are arranged linearly in the ferrule such that the third heat path distance is roughly twice the distance of the first or the second heat path distances.

13. The fiber-based thermal property probe of claim 11, wherein the ferrule is configured to rotate a rotation distance during operation of the fiber-based thermal property probe such that it is configured to measure thermal properties of the sample as a function of the sample's angular orientation relative to the first, second, and third fiber locations.

14. A fiber-based thermal property probe, comprising:
four or more fibers having fiber ends, the fiber ends bundled in a ferrule, the ferrule being configured to hold each of the four or more fiber ends at fixed, known separation distances from each other;
a pump beam source configured to transmit a pump beam through any of the four or more fibers to heat a sample at its surface;
a probe beam source configured to transmit a probe beam through any of the four or more fibers to measure the temperature of the sample surface;
wherein:
the pump and the probe beams transmitted through any of the four or more fibers create heat path distances at the sample surface that are the distances between the respective pump beam and the probe beam, when incident on the sample surface and the pump beam and the probe beam are transmitted through any one of the four or more fibers.

15. A method for providing a fiber-based thermal-property probe, the method comprising:
providing a pump beam source configured to transmit a pump beam through a pump fiber, the pump beam configured to heat a sample at its surface and the pump fiber having a pump fiber sample end;
providing a probe beam source configured to transmit a probe beam through a probe fiber, the probe beam configured to measure the temperature of the sample surface and the probe fiber having a probe fiber sample end;
providing a ferrule configured to hold the pump and the probe fiber sample ends at a fixed, known separation distance from each other;
wherein the pump beam and the probe beam, when incident on the sample surface, create a heat path distance at the sample surface that is the distance between the pump beam and the probe beam, when incident on the sample surface.

\* \* \* \* \*